(12) United States Patent
Grebenik et al.

(10) Patent No.: US 8,555,055 B2
(45) Date of Patent: Oct. 8, 2013

(54) DELEGATION MODEL FOR ROLE-BASED ACCESS CONTROL ADMINISTRATION

(75) Inventors: Vladimir V. Grebenik, Redmond, WA (US); Pretish Abraham, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 491 days.

(21) Appl. No.: 12/476,286

(22) Filed: Jun. 2, 2009

(65) Prior Publication Data

US 2010/0306817 A1  Dec. 2, 2010

(51) Int. Cl.
| | |
|---|---|
| *H04L 29/06* | (2006.01) |
| *G06F 17/00* | (2006.01) |
| *G06F 7/04* | (2006.01) |

(52) U.S. Cl.
USPC .......... 713/157; 713/155; 713/166; 726/1; 726/21; 726/28

(58) Field of Classification Search
USPC .......... 726/1, 21, 28; 713/155, 157, 166
See application file for complete search history.

(56) References Cited

U.S. PATENT DOCUMENTS

| | | | |
|---|---|---|---|
| 7,162,633 B2 | 1/2007 | Wang et al. | |
| 7,909,237 B2* | 3/2011 | Tredeau et al. | 235/375 |
| 2003/0115292 A1* | 6/2003 | Griffin et al. | 709/219 |
| 2003/0229623 A1* | 12/2003 | Chang et al. | 707/3 |
| 2005/0138031 A1 | 6/2005 | Wefers | |
| 2005/0138420 A1 | 6/2005 | Sampathkumar et al. | |
| 2006/0037081 A1* | 2/2006 | Moses et al. | 726/27 |
| 2006/0241992 A1 | 10/2006 | Yaskin et al. | |
| 2008/0120302 A1 | 5/2008 | Thompson et al. | |
| 2009/0006412 A1* | 1/2009 | Wallace et al. | 707/9 |
| 2009/0007262 A1* | 1/2009 | Wallace et al. | 726/21 |
| 2009/0063210 A1 | 3/2009 | Hunag et al. | |
| 2009/0138319 A1* | 5/2009 | Ratnala | 705/9 |
| 2009/0235334 A1* | 9/2009 | Park | 726/4 |
| 2009/0327911 A1* | 12/2009 | Ningune et al. | 715/744 |

OTHER PUBLICATIONS

"An Introduction to Role-Based Access Control", Retrieved at <<http://csrc.nistgov/groups/SNS/rbac/documents/design_implementation/Intro_role_based_access.htm>>, NIST/ITL Bulletin, Dec., 1995.

Moffett, et al."The Uses of Role Hierarchies in Access Control", Retrieved at <<http://moffett.me.uk/jdm/pubs/UsesOfHierarchies.pdf>>, 4th ACM Workshop on Role Based Access Control (RBAC), Oct. 28-29, 1999 George Mason University, Fairfax, VA.

"Overview of Delegated Administration Role Hierarchy" Retrieved at <<http://www.academypublisher.com/jsw/vol03/no06/jsw03060920.pdf>>.

"Overview of Delegated Administration Role Hierarchy" Retrieved Mar. 31, 2009 at <<http://www.academypublisher.com/jswlvoI03/no06/jsw03060920.pdf>>.

* cited by examiner

*Primary Examiner* — Mohammad W Reza
(74) *Attorney, Agent, or Firm* — Hope Baldauff, LLC

(57) ABSTRACT

Role-based security architecture that facilitates delegated role assignments where role functionality is monotonically decreasing. In furtherance thereof decreasing monotonicity roles are arranged in a hierarchy. Moreover, delegated roles can be obtained by creating a derived role (from a parent role) and removing entries from the derived role to decrease the permissions for the derived role. Delegated role assignments are scoped (bounded), which automatically applies a given scope to the assignment created by the user receiving the delegation.

17 Claims, 10 Drawing Sheets

DELEGATION MODEL FOR ROLE-BASED ACCESS CONTROL ADMINISTRATION

BACKGROUND

The administration of services in organizations is becoming increasingly resource intensive and complicated due to the many services deployed in and across the enterprise. Role-based access control (RBAC) is an alternative methodology that assigns employees to roles that relate to job functions. Users acquire permissions through the role, and hence, are not assigned the permissions directly. While users and permissions may change frequently, roles are comparatively stable, and thus, simplify administration.

Delegation can provide one efficient approach for managing the administration load. For example, consider that an administrator wants to delegate part of the functionality of an existing administrative role, where a role defines the tasks and code that can be run by a user assigned the role. The administrator modifies the role, but thereafter, over a period of time and perhaps several role modifications it is difficult to know whether the role has a smaller or larger set of permissions. Thus, permission auditing is problematic.

In an access control list regime this modification is performed by adding access control entries, which are difficult to audit. In RBAC, modification can be accomplished by adding and removing actions. However, ensuring some consistency and order between roles is not possible.

In another scenario, an organization administrator wants to completely delegate server management in Europe to a European administrator. Moreover, the organization administrator also wants the European administrator to be able to further delegate this functionality, but still be limited to European servers and not exceed functionality granted initially. A problem is to selectively delegate functionality over a particular scope with or without delegation capabilities.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is a role-based security system that facilitates delegated role assignments where role functionality is monotonically decreasing. In furtherance of such decreasing monotonicity roles are arranged in a hierarchy. Moreover, delegated roles can be obtained by creating a derived role (from a parent role) and removing entries from the derived role to decrease the permissions for the derived role. Additionally, delegated role assignments are scoped (bounded), which automatically applies a given scope to the assignment created by the user receiving the delegation.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
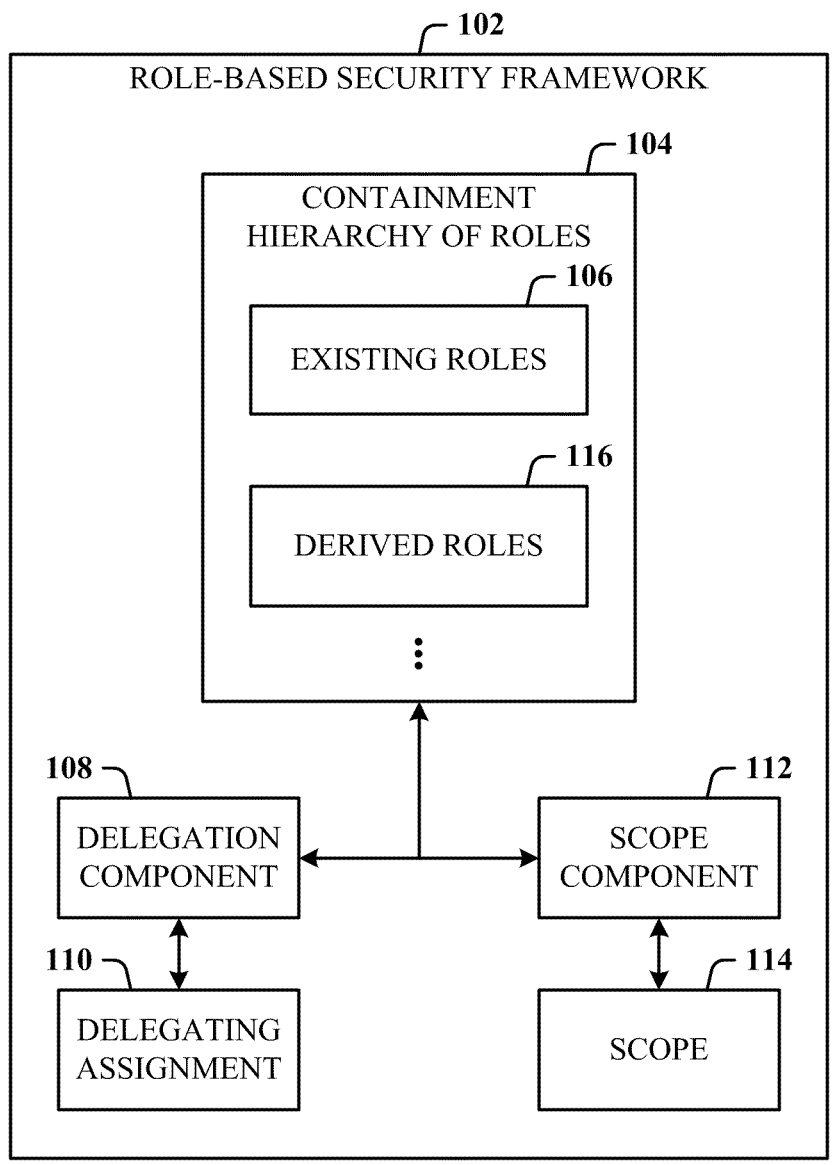
FIG. 1 illustrates computer-implemented role-based delegation system in accordance with the disclosed architecture.

The disclosed architecture employs a delegation model that includes roles and scopes to manage administrator permissions. A role is defined as a list of tasks and code (e.g., scripts) that can be run by a user assigned to this role. A scope is a set of objects on which tasks defined in the role can operate. The delegation model allows the delegator to delegate a role and define the bounds to the delegation.

The delegation model employs two types of role assignments: functional assignments and delegating assignments. The functional assignment of a role indicates that a user can execute actions defined in the role assignment, but cannot delegate to others. The delegating assignment indicates that a user cannot execute actions, but can delegate to others, including the user that made the delegation.

Initially, only pre-defined ("canned") roles are installed, which cannot be modified. New roles are not created "empty"—the user specifies a parent role from the pre-defined roles received in the distribution. Thus, new roles derive from existing roles. A derived role has a hierarchical relationship with its parent, and initially, contains a full copy of the parent entries. Thereafter, the derived role can be modified and, actions can be removed and added back. However, at no point in time can a derived role contain actions or parameters that are not present in its parent.

This delegation model allows an administrator (e.g., a super administrator) to create a derived role (with some actions removed), and then delegate the role to other subordinate users (e.g., administrators). The subordinate administrator can then further narrow the role and delegate the further narrowed role (or further derived role), but cannot possibly exceed permissions originally granted to the subordinate administrator.

Similar logic applies to scopes, where scopes can be compared. In this case, if a user is a delegatee (a user receiving delegated permissions from a delegator) on a role in a particular scope, the delegatee can only further grant the role within that same scope or smaller scope. The ability to modify roles is allowed according to an "organization-wide" scope, that is, the user can only modify a role if the user has no restrictions in delegation.

For example, if User A has a delegating role assignment for a "Recipient Management" role in a "Users" OU (organizational unit), then User A can only grant that role within that scope. When User A assigns this role to User B, User B is automatically restricted to management of that OU. User A can reduce the scope of User B's assignment, but User A can never expand User B's scope beyond User A's scope (e.g., "Users" OU).

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates computer-implemented role-based delegation system 100 in accordance with the disclosed architecture. The system 100 includes a role-based security framework 102 that includes roles in a containment hierarchy of roles 104. The roles can include existing (or pre-canned) roles 106 that ship with the product. The system 100 can also include a delegation component 108 of the role-based security framework 102 for creating and configuring a delegating assignment 110, and a scope component 112 of the role-based security framework 102 for defining a scope 114 of the delegating assignment 110.

The containment hierarchy of roles 104 can also include derived roles 116, which are derived from the existing roles 106 and/or from other derived roles. An existing role (a parent to a child or derived role) includes permission entries that define the permissions for that role in accessing resources. The permission entries are in the form of actions and action parameters that define access to the resources. The derived role includes equal or fewer of the actions and action parameters of the existing role from which the derived role is created (or generated). The actions and action parameters of the derived role can be removed and/or added back, not to exceed the actions and action parameters of the existing role from which the derived role is created. In other words, the derived role cannot have an entry that is not already an entry that is present in the existing (or parent) role. Thus, role modification can be accomplished by adjusting the composition of the entries.

The derived role is derived from one of the existing roles, and the scope of the derived role is limited to the scope of the existing role from which the derived role is created. In other words, the scope of the derived role cannot exceed the scope of the parent role from which the derived role is generated. Note also that the scope component 112 automatically scopes the derived role to the appropriate actions and action parameters of the parent (e.g., existing) scope from which the derived role is generated. Thereafter, entry modification (e.g., removal) can be performed to further narrow the scope of the derived role.

Figure 2:
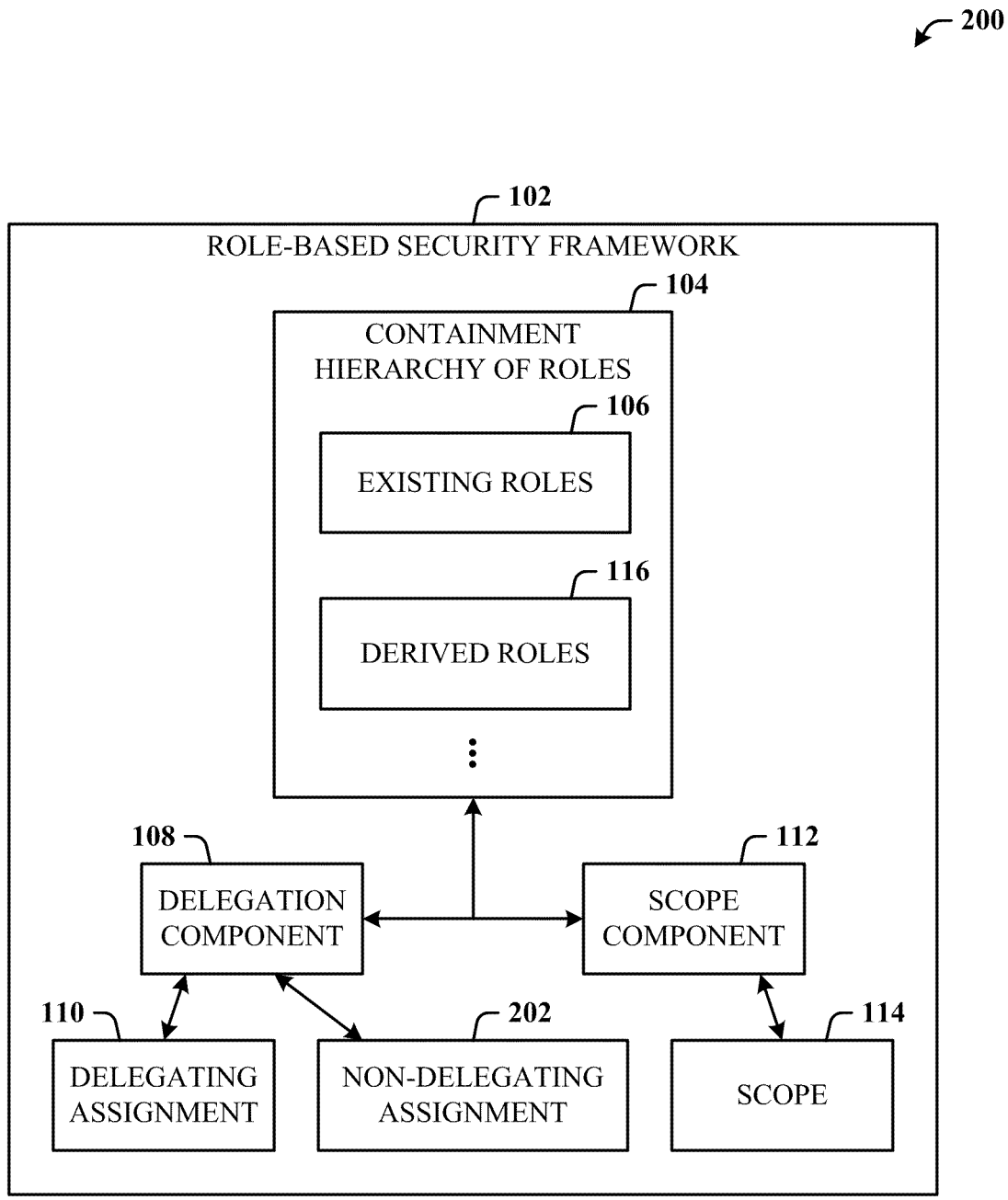
FIG. 2 illustrates an alternative embodiment of a role-based delegation system that further provides a non-delegating role assignment.

FIG. 2 illustrates an alternative embodiment of a role-based delegation system 200 that further provides a non-delegating assignment 202. The delegation component 108 further allows for the creation and configuration of the non-delegating (or functional) assignment 202.

Put another way, the role-based delegation system comprises the role-based security framework 102 that includes the existing roles 106 in the containment hierarchy of roles 104, the delegation component 108 of the role-based security framework 102 for creating and configuring the delegating assignment 110 for one of the existing roles 106, and the scope component 112 of the role-based security framework 102 for defining a scope of the delegating assignment 110 relative to the scope of the existing role. The delegation component 108 allows or denies creation of a derived role, in addition to allowing or denying creation of a new delegating or non-delegating assignment to any role. The scope component 112 automatically defines correct scope for a new role assignment (delegating or non-delegating) based on the scope of the delegating assignments of the role being assigned, or its parents. While roles have implicit scopes, the assignment scopes determined by the scope component 112 are primarily based on the scopes of the delegating assignment (which in turn are the same or narrower than role scopes).

The existing roles 106 include permission entries that define access to resources, and a derived role includes equal or fewer of the entries of the existing role from which the derived role is created. The permission entries include actions and action parameters that can be removed or added back, not to exceed permissions defined by the actions and action parameters of the existing role from which the derived role is created.

The delegation component 108 facilitates the creation and configuration of the non-delegating assignment 202 for a role that prevents delegation of the role. The scope of the delegating assignment 110 is limited to the scope of the existing role or a smaller scope than the existing role.

Figure 3:
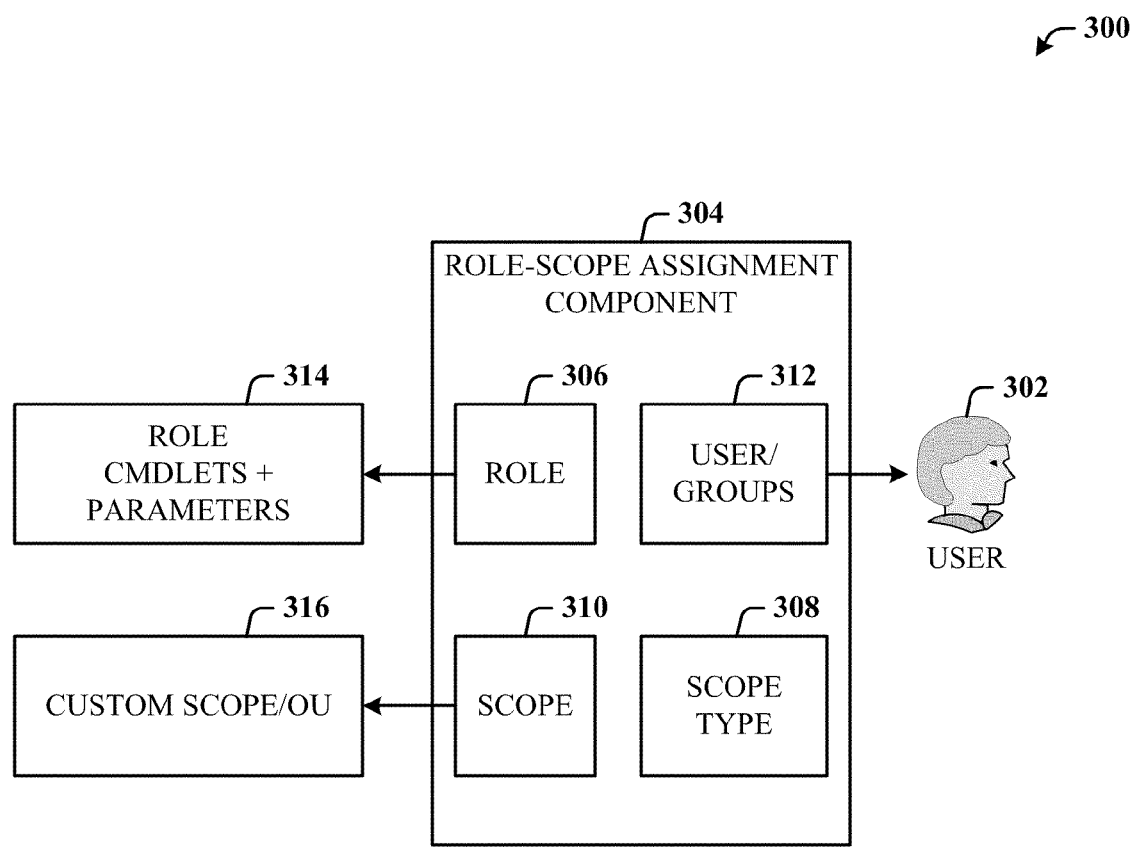
FIG. 3 illustrates a system for role and scope assignment to a user.

FIG. 3 illustrates a system 300 for role and scope assignment to a user 302. The system 300 includes a role-scope assignment component 304 for defining a role 306, scope type 308, scope 310 for the scope type 308, and then assigning the role 306 and scope 310 to a user (e.g., user 302) or groups of users 312. The role 306 includes role actions (e.g., commandlets—"cmdlets") and action parameters 314 that define the permissions associated with the role 306. The system 300 also includes derivations of the scope 310, which comprise custom scope or an organizational unit (OU) scope 316.

Roles and scopes can be assigned to both users and groups. Ways in which to grant administrators roles and scopes include indirectly by adding the administrator to a group that is already granted a specific scope and role, and directly using scope and role assignment actions.

Using groups for delegation is a natural way of simplifying things, but in the RBAC world there is a danger that a recipient administrator or someone who has permissions to add a distribution group member in the same scope as that group will be able to add itself to any administration group. To mitigate this problem the groups used for delegation need to live in a separate scope (can be an "exclusive" OU or a top-level OU).

Delegation rules can include the following:

Roles are organized in a containment hierarchy and derived roles are located directly under the parent roles In order to delegate a role to another user, an administrator must have a role assignment for this role or any of its parents with a "delegating" flag. Scope of the delegated role is limited to the scope of that delegating role assignment.

In order to modify a role, a restricted version of this rule applies: an administrator has a role assignment for this role or any of its parents with a special "delegating" flag and there are no scope restrictions on this assignment (the scope is be org-wide).

If an administrator needs to modify role, scope, or role assignment in a lower-level tenant (as defined by the organizational hierarchy), then the administrator can make the modification without restrictions by employing the correct actions, and tenant is in this scope. (It is possible to grant, "new-role" to a higher-level administrator and use only one of several tenants as a scope—in which case the higher-level administrator will only be able to create new roles in that one tenant only)

Figure 4:
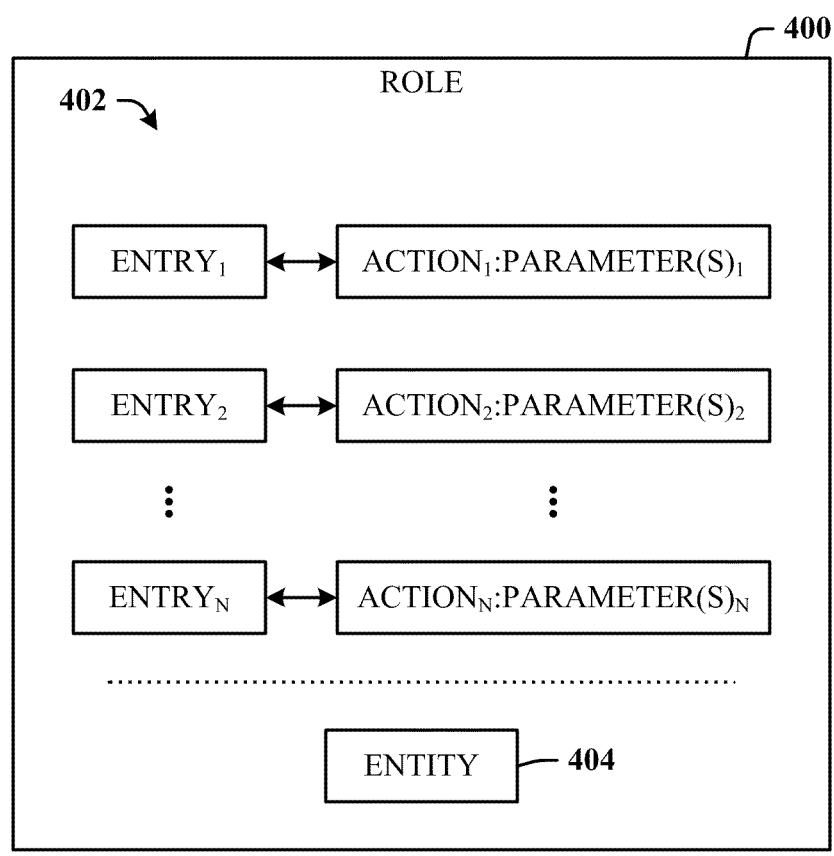
FIG. 4 illustrates an example of a role that includes permission entries having actions and action parameters.

FIG. 4 illustrates an example of a role 400 that includes permission entries having actions and action parameters. The role 400 includes entries (denoted Entry$_{1-N}$), and each entry is mapped to an action (denoted Action$_{1-N}$) and an action parameter (denoted Parameter(s)$_{1-N}$). These entry-action mappings 402 of the role 400 are then associated with an entity 404 (e.g., a user, system). Consider that if the set 1-N of mappings 402 is the current total set of the mappings that are employed, extensibility is provided to remove one or more of the mappings 402 to provide a new role for utilization in the role-based security framework. When a new mapping is created, the current set now includes one additional mapping thereby providing the capability for a new role. Thus, by mixing the combination of mappings, different roles can be employed for the correspondingly different organization functions, new or existing.

Figure 5:
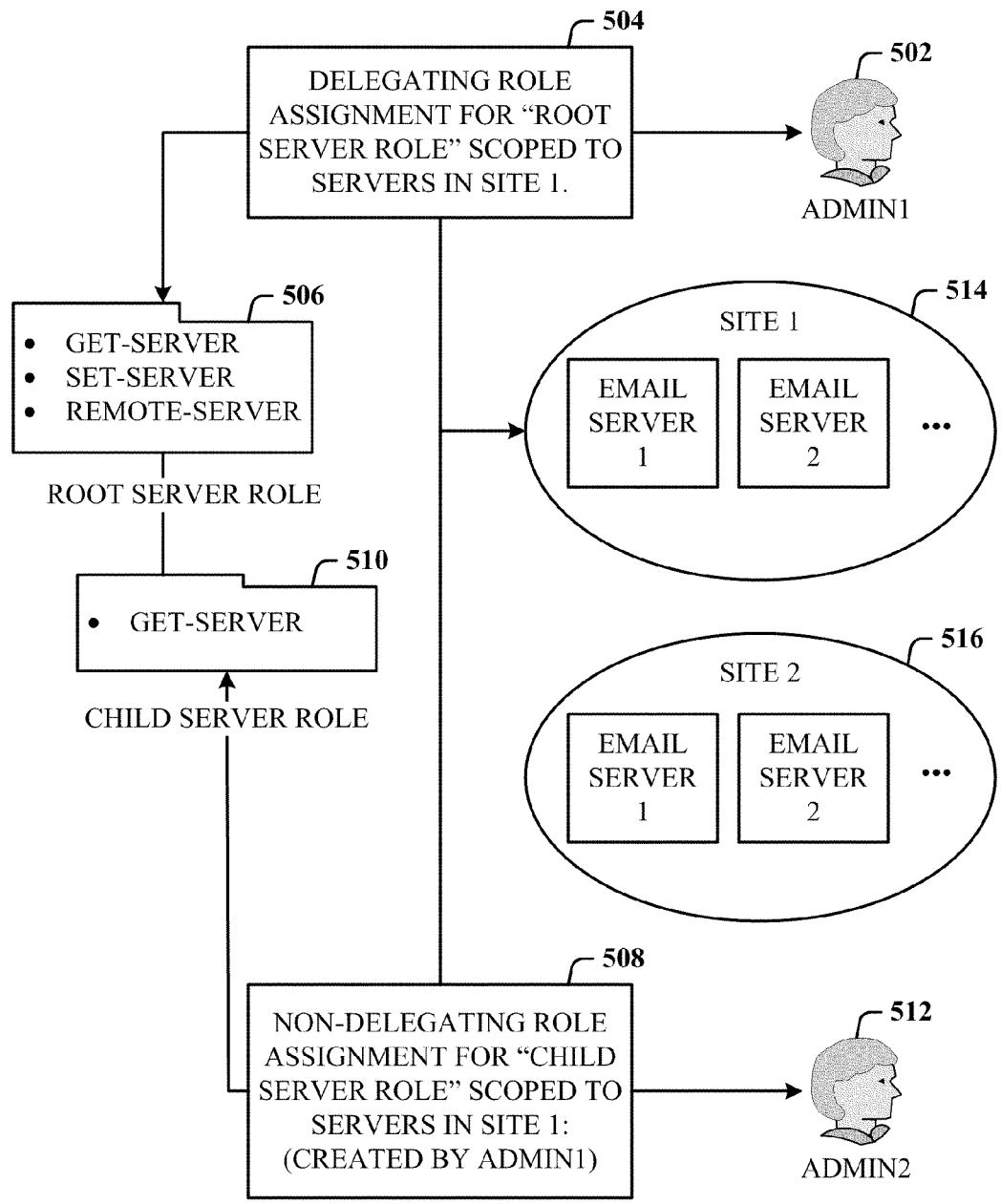
FIG. 5 illustrates a system flow for delegating and non-delegating role assignments in accordance with the disclosed architecture.

FIG. 5 illustrates a system flow 500 for delegating and non-delegating role assignments in accordance with the disclosed architecture. A first administrator 502 (Admin1) has a delegating role assignment 504 for a Root Server Role 506 for creating a non-delegating (functional) role assignment 508 of a child role 510 to a second administrator 512 (Admin2). This non-delegating role assignment is automatically scoped to a first site 514 (Site 1) and cannot exceed the scope of the granting user (Admin1), and no access is granted to a second site 516 (Site 2). The child role 510 contains a subset of commands (entries) available in the parent role (server role 506). Note that the child role 510 is not allowed to have role entries different than those existing in the parent role (server role 506).

The disclosed architecture enhances RBAC with delegation of a role and definition of the bounds on how that delegation can be done. Each role assignment has a role assignment type that indicates if the role is a regular role assignment or delegating role assignment. Each role has entries that include actions (e.g., cmdlets) and action parameters. A user of a regular role assignment can perform actions. A delegating role assignment user cannot perform actions, but can delegate to other users (within this role assignment scope).

A delegator bit implies the capability to delegate the role to other users provided there is a delegating role assignment for that role or a higher role, capability to remove the role if there is a delegating role assignment for that role or a higher role, capability to create a new role if there is a delegating role assignment for a template role or a higher role, and capability to update an existing role (add/remove actions/parameters) if there is a delegating role assignment for that role or a higher role.

Consider a first delegation scenario. All role management and role assignment is centralized. A top-level administrator can customize pre-canned (existing) roles for department administrator. The top-level administrator performs the role assignment for the department administrator and further restricts scopes for department management only. This scope can never be exceeded by the department administrator. If the department administrator wants to delegate access further in the department, the top-level administrator is contacted. Since the management and assignment tasks are centralized, the department administrator does not need to know much about role management. The department administrator can neither clone/remove/modify roles nor perform new/remove/modify role assignments. The top-level administrator performs all of this.

In a second delegation scenario, all role management is centralized by the top-level administrator, and role assignment capability is delegated to department administrators (de-centralized). The top-level administrator wants to create a new customized Role A for the department administrator. The top-level administrator creates Role A by cloning from an existing role or a pre-canned (shipped) role. The top-level administrator configures the initial Role A assignment to the department administrator and restricts scopes for the department only. The scope can be an OU+Filter scope (Department—eq 'Dept1'), for example.

However, the top-level administrator does not want to be bothered each time additional delegation is needed within the department. Hence, the top-level administrator can allow delegation privileges for the department administrator. In addition to the above assignment, the top-level administrator sets a delegator property on the Role A assignment for the department administrator. This is referred to as the delegating assignment. If the delegator property is not set, the assignment is a regular assignment and the department administrator cannot delegate this assignment further. The department administrator is not allowed to remove or modify the delegating assignment that was set by the top-level administrator on the department administrator. This ensures that the depart administrator cannot tamper or exceed the scopes set on the delegating assignment—only the top-level administrator can remove the delegating assignment.

More specifically, the top-level administrator assigns the department administrator a "Role Assigner" privilege—which grants the department administrator restricted access to the role assignment and scope management actions. This is restricted because the "Role Assigner" privilege does not grant access to the delegation parameter in the role assignment cmdlet.

Using the role assignment actions, the department administrator can now delegate or assign Role A to other persons in the department and is limited to restrict scopes further within Role A assignment scope. The new assignees cannot delegate further because the department administrator does not have access to supply the delegation parameter in the role assignment. The regular type role assignment can be removed anytime.

The top-level administrator can disable or remove Role A or Role A assignments (delegating or regular) at anytime. Hence, the top-level administrator can lock down access anytime. This is allowed because the top-level administrator has a delegating assignment of the parent role (parent of Role A) and can, hence, manage a down-level role and the associated role assignments.

Typically, in this scenario, the department administrator cannot clone/remove/modify roles. However, if this capability is desired, the top-level administrators can grant a role assignment with the same delegating property for the role that needs to be cloned.

In a third delegation scenario, all role management is centralized by a hosted operator and role assignment capability is delegated to tenant administrators. This is the same as in the second scenario, but in an enterprise (substitute hoster for the top-level administrator and substitute tenant for the department administrator). The exception in this scenario is that the hoster creates Role A under tenant configuration; hence, it is visible to the tenant organization.

In a fourth scenario, all role management is centralized by a hosted operator, but wants to onboard tenant roles and delegate that tenant role management to the tenant administrator. Role assignment capability is also delegated to the tenant administrator. The hosted operator wants to onboard roles for Tenant so tenants can assign and clone the role further. The tenant wants to further customize the onboard roles and manage roles in the tenant organization with role assignment privileges. The hosted operator clones a new role (e.g., Role A) under the Tenant configuration and customizes the role for tenant purposes. The hosted operator grants the tenant administrator an assignment (e.g., Role Administrator role for all role management actions) with access to the NewRole, RemoveRole, Add-ManagementRoleEntry, Set-ManagementRoleEntry, RoleAssignment—basically, the role management and role assignment capabilities. This assignment is limited to the Tenant scope. Thus, the tenant administrator can manage roles only under the Tenant scope. This assignment is also regular; hence, Tenant cannot delegate this role management capability to other tenant administrators.

The hosted operator can grant the tenant administrator an assignment for Role A with the delegating property. The cloned role lives in the Tenant organization. The cloned role is now a tenant role and has been successfully onboarded, and is now manageable by the tenant administrator. The tenant administrator can now assign Role A to other tenant administrators because tenant administrator has delegating assignment on Role A. The tenant administrator can clone other roles, for example, Role B from Role A. The tenant administrator can assign Role B to other tenant administrators because of the Tenant administrator delegating assignment on Role A (parent role of Role B).

Following is a description of allowing top-level administrators unlimited role management access. A scenario is where the top-level administrator wants to clone/modify/delete a role, even if not created by the top-level administrator. To create/modify/remove a role, a user has a role assignment with a delegator bit for the role being created/modified/removed. To manage the role management actions, a pre-canned role called Role Administrator is provided for assignment to organization administrators, who are the top-level administrators. The top-level administrator has a role assignment with the delegating bit and access to all role management actions.

Since all roles derive from the pre-canned roles, the top-level administrator will have access to any down-level (or derived) role. The scope of the role assignment for top-level administrators is configuration wide without restriction. Thus, these role administrators will be able to clone/modify/remove any role (roles will be stored under the role administrator configuration container). The top-level administrator cannot modify pre-canned roles using any of the role management actions. This preserves the default secure behavior of pre-canned (shipped) roles.

The top-level administrator can remove or disable delegating type role assignments for pre-canned roles, unless the last assignment. This works in the case of hosted scenarios, as well. The hosted operator is the top-level administrators and has unrestricted access for the hosted organization and below, because of the delegating assignment. The tenant configuration is another part of the containment hierarchy (e.g., tree), but the hoster operator has unlimited access to Tenant roles. Hence, the hoster administrator can clone/delete/modify any new role under the hosted organization, which includes managing roles under the tenant organization.

The top-level administrator/hosted operator administrator can then run actions, represented by the following comments:

```
# Top admins can clone/modify/assign any role, because of
unrestricted delegating assignment.
    # Top level admin can assign any role to John Doe.
    # Top level admin can add or remove parameters to any
role. Parent role must have the same parameters (role tree
must be balanced).
    # Top level admin can remove cmdlet from any role. Child
role must not have the same cmdlet/parameters.
    # Top level admin can remove any role.
```

Following is a description of limiting role management to tenant administrators. Tenant administrators cannot clone/modify/delete any role, except for roles allowed to be managed by the tenant administrator.

Consider the delegation scenario below for a hoster and tenant administrator. The hoster can run actions, represented by the following comments:

```
    # permission to clone
    # permission to add/remove/update role cmdlet/params
    # permission to assign RoleAssigner to Tenant admin
    # permission to assign RoleAdmin to Tenant Admin
    # permission to assign new role to tenant admin with
delegating
```

The tenant administrator can run actions, represented by the following comments:

```
    # permission to assign new role to other tenant admins
    # cannot remove delegating role assignment
```

(Not allowed to remove delegating role assignment. Must have delegating access to a higher role.)

```
    # permission to clone new role because of delegation
assignment on parent
    # no permission to specify delegator privilege (delegator
param restricted)
    # permission to assign down-level roles because of
delegating assignment on parent role
    # permission to remove role assignment on down-level
roles because of delegating assignment on parent role and the
assignment is in their scope
    # no permission to remove delegated role assignment and
    hence no permission to remove Tenant RecipMgmt role
```

(Cannot remove role without removing role assignment first.)

Following is a description of limiting role modification capability to tenant administrators. Consider that department administrators can modify, add/remove actions (e.g., cmdlets) and parameters (action parameters) to roles the department administrator is allowed to manage.

The top-level administrator can run actions, represented by the following comments:

```
# Top Admin clone role on behalf of Dept Admin
# Top Admin assigns role assigner role on behalf of Dept Admin
# Top Admin assigns DeptRecipMgmtRoleDA to Dept Admin with delegator
```

The department administrator can run actions, represented by the following comments:

```
# Dept admin cannot add or remove parameters to any role
because of scope restriction - even though the Dept admin has
delegating assignment. Must have delegating assignment to
parent role to add parameters with unrestricted scopes.
```

(Having delegating assignment with scope restriction is not enough, since elevated access can be obtained with scope restriction in one role and while obtaining access in another role. In other words, the department administrator is scoped to a department while the role is global—may be used in other departments. The scoped role assignment does not give privilege(s) to make changes that have a global effect. Parent role must have the same parameters (role tree must be balanced). No access to update role because need delegating assignment to parent role. (Any administrator (e.g., top-level administrator) with delegating access to higher parent role is required with unrestricted scopes.)

```
# Dept admin cannot remove cmdlet from any role - even
with delegating assignment because of restrictive scope.
Child role must also not have the same parameters that need to
be removed (role tree must be balanced).
```

(Any administrator (e.g., top-level administrator) with delegating access to target role is required with unrestricted scopes.)

```
# Assume Top Admin assigns role admin role to Dept Admin.
# Dept. admin tries clone new roles
```

(No access to create new role because of restricted scope even with delegating assignment. This is to prevent the department administrator from cloning a new role and setting an unrestricted assignment on the department administrator.)

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
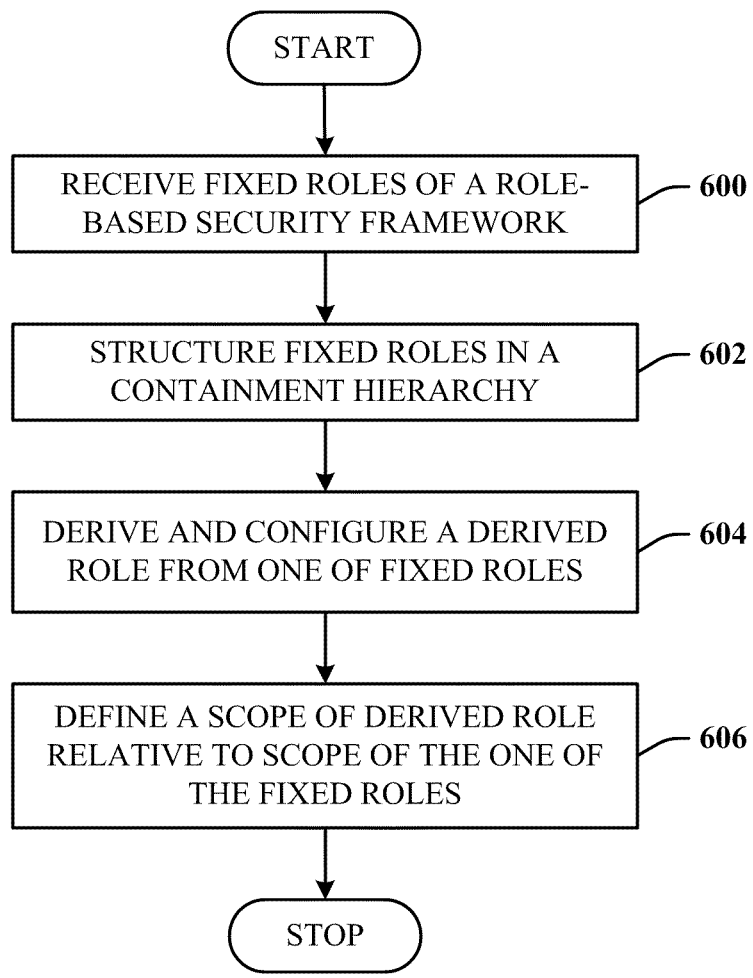
FIG. 6 illustrates a role-based delegation method.

FIG. 6 illustrates a role-based delegation method. At 600, fixed roles of a role-based security framework are received. The fixed roles are the shipped or pre-canned roles received in the production distribution. At 602, the fixed roles are structured in a containment hierarchy. At 604, a derived (e.g., delegating) role is derived and configured from one of the fixed roles. At 606, a scope of the derived role is defined relative to scope of the one of the fixed roles.

Figure 7:
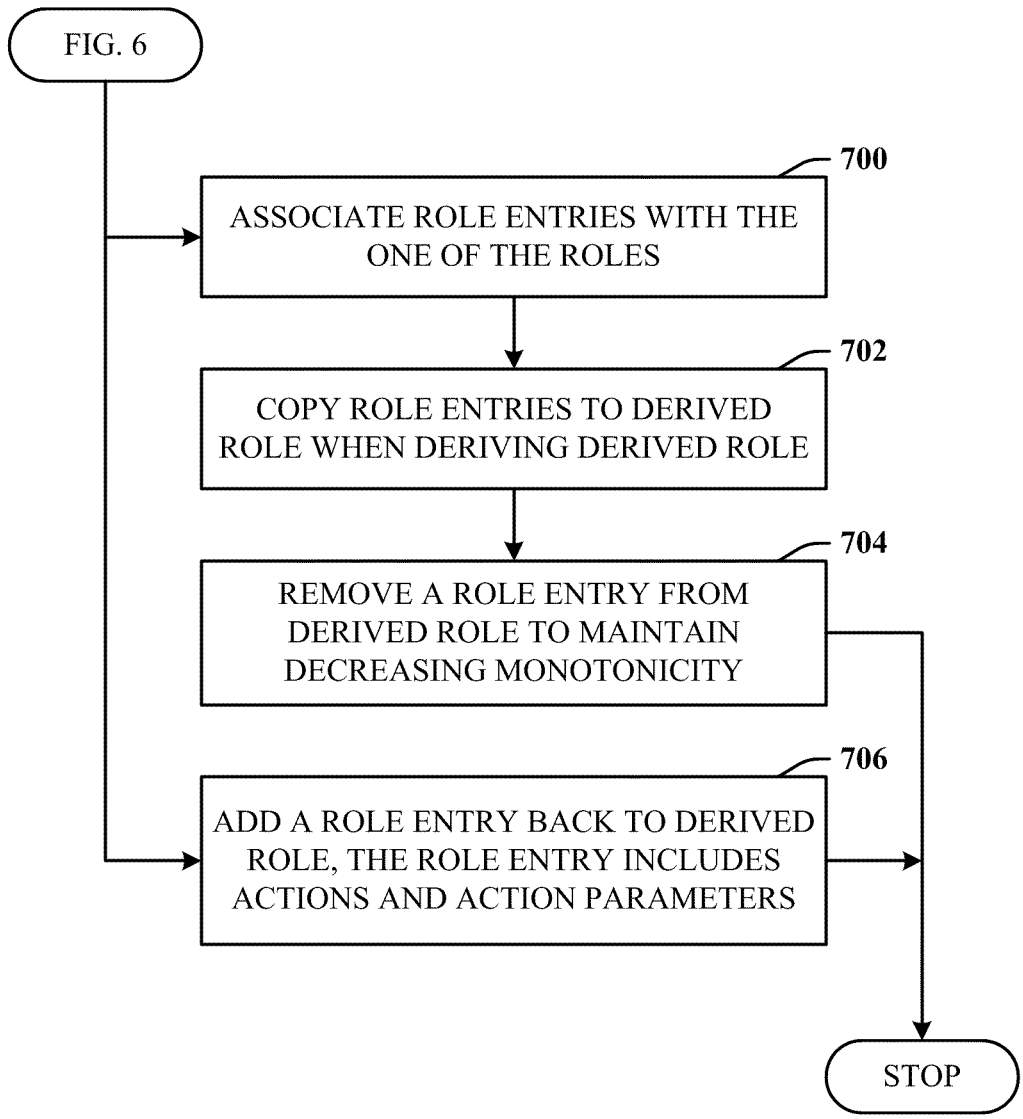
FIG. 7 illustrates additional aspects of the method of FIG. 6.

FIG. 7 illustrates additional aspects of the method of FIG. 6. At 700, role entries are associated with the one of the roles. At 702, the role entries are copied to the derived role when deriving the derived role. At 704, a role entry is removed from the derived role to maintain decreasing monotonicity. At 706, a role entry is added back to the derived role. The role entry includes actions and action parameters.

Figure 8:
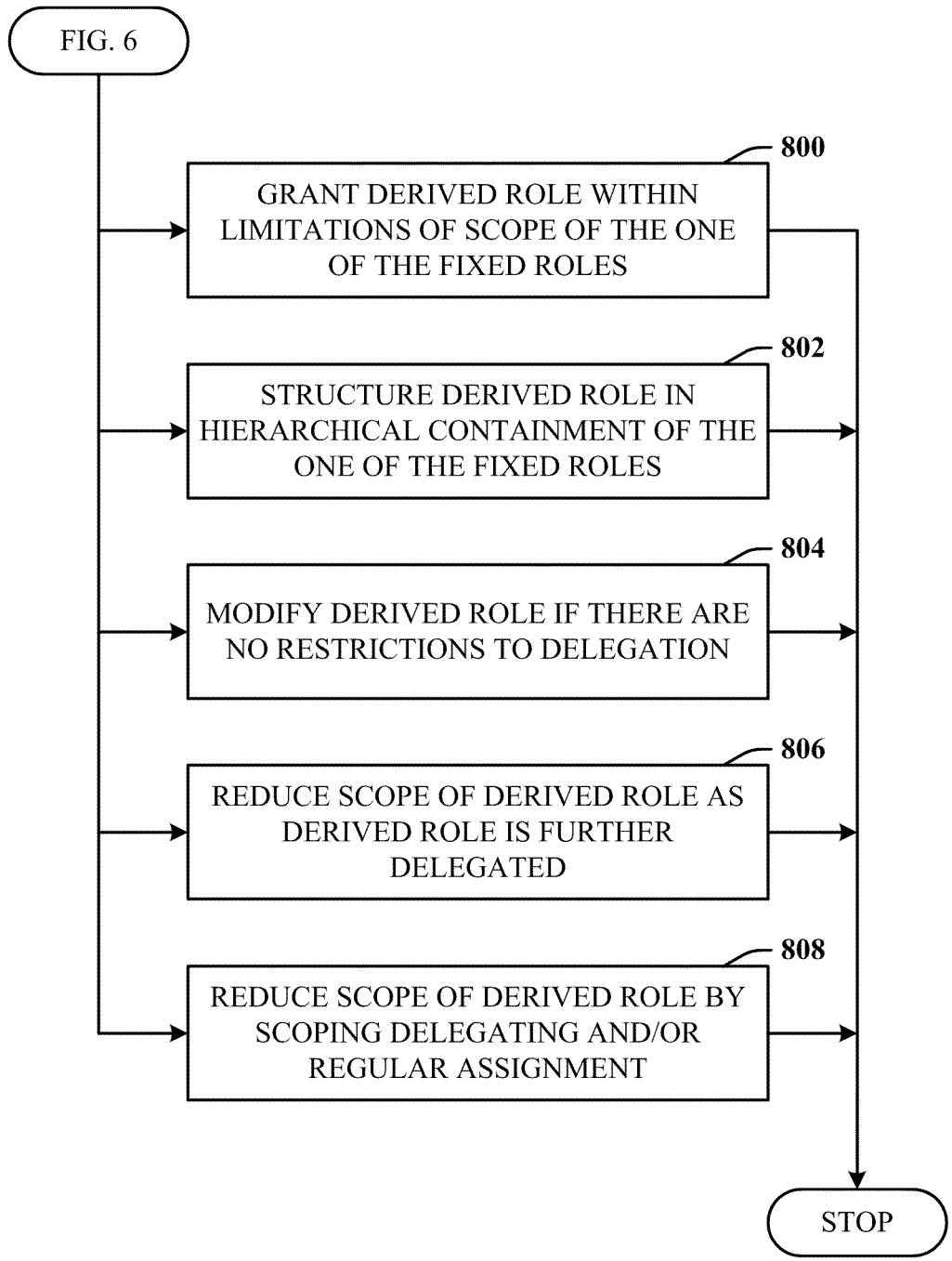
FIG. 8 illustrates additional aspects of the method of FIG. 6.

FIG. 8 illustrates additional aspects of the method of FIG. 6. At 800, the derived role is granted within limitations of the scope of the one of the fixed roles. At 802, the derived role is structured in hierarchical containment of the one of the fixed roles. At 804, the derived role is modified if there are no restrictions to delegation. At 806, the scope of the derived role is reduced as the derived role is further delegated. In other words, the scope associated with a role can be modified. Alternatively, at 808, the scope of derived roles can be reduced via scoping the delegating and/or regular assignment that the role creator also creates. In other words, the sequence is: create derived role R for use in Dept. A, create a new role assignment for the derived role R, and then assign the new role assignment to Dept. A administrator, scoped to Dept A users. This can be a delegating and/or non-delegating assignment.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
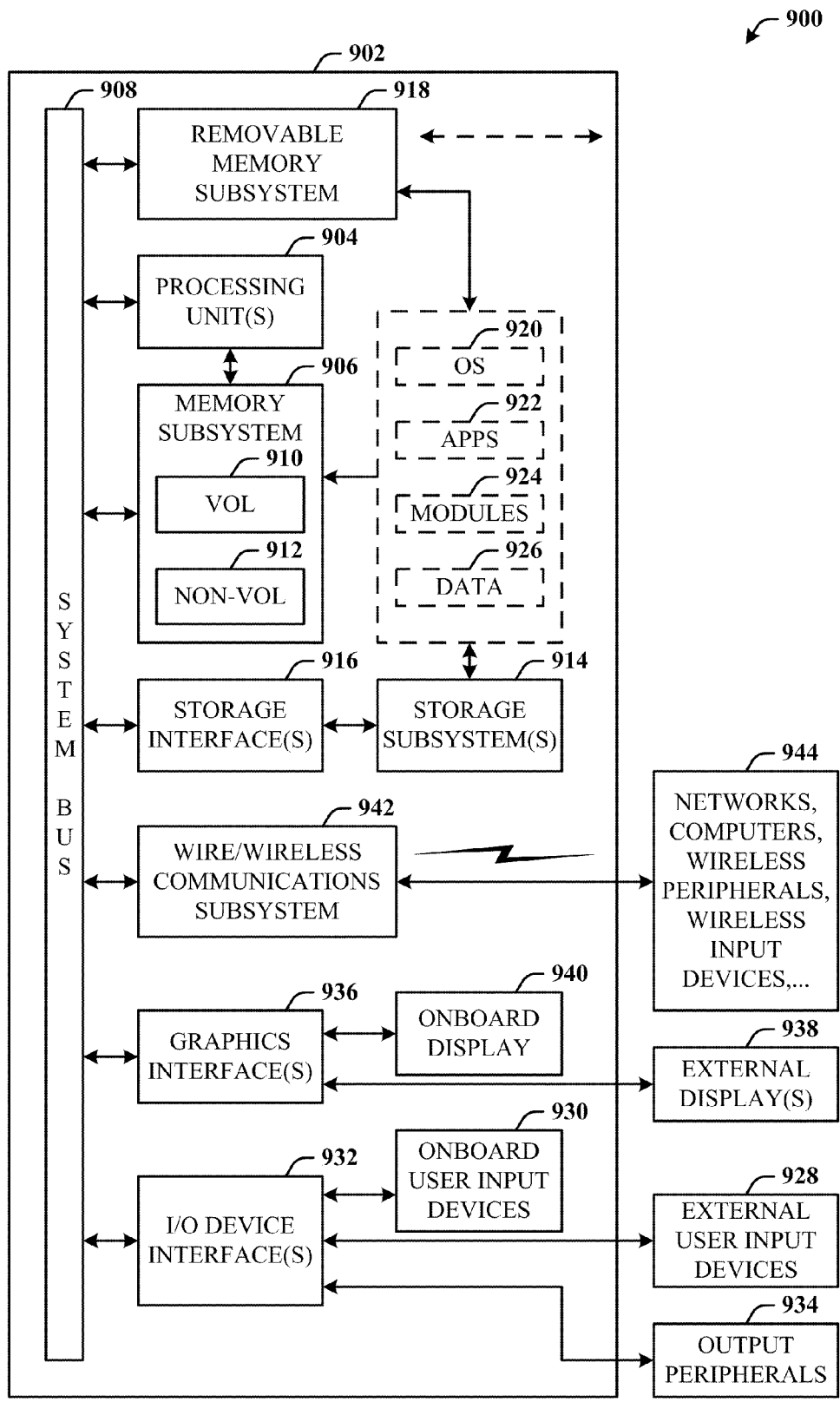
FIG. 9 illustrates a block diagram of a computing system operable to execute delegation in accordance with the disclosed role-based security architecture.

Referring now to FIG. 9, there is illustrated a block diagram of a computing system 900 operable to execute delegation in accordance with the disclosed role-based security architecture. In order to provide additional context for various aspects thereof, FIG. 9 and the following discussion are intended to provide a brief, general description of the suitable computing system 900 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 900 for implementing various aspects includes the computer 902 having processing unit(s) 904, a system memory 906, and a system bus 908. The processing unit(s) 904 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 906 can include volatile (VOL) memory 910 (e.g., random access memory (RAM)) and non-volatile memory (NON-VOL) 912 (e.g., ROM, EPROM, EEPROM, etc.). A basic input/output system (BIOS) can be stored in the non-volatile memory 912, and includes the basic routines that facilitate the communication of data and signals between components within the computer 902, such as during startup. The volatile memory 910 can also include a high-speed RAM such as static RAM for caching data.

The system bus 908 provides an interface for system components including, but not limited to, the memory subsystem 906 to the processing unit(s) 904. The system bus 908 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 902 further includes storage subsystem(s) 914 and storage interface(s) 916 for interfacing the storage subsystem(s) 914 to the system bus 908 and other desired computer components. The storage subsystem(s) 914 can include one or more of a hard disk drive (HDD), a magnetic floppy disk drive (FDD), and/or optical disk storage drive (e.g., a CD-ROM drive DVD drive), for example. The storage interface(s) 916 can include interface technologies such as EIDE, ATA, SATA, and IEEE 1394, for example.

One or more programs and data can be stored in the memory subsystem 906, a removable memory subsystem 918 (e.g., flash drive form factor technology), and/or the storage subsystem(s) 914 (e.g., optical, magnetic, solid state), including an operating system 920, one or more application programs 922, other program modules 924, and program data 926.

The one or more application programs 922, other program modules 924, and program data 926 can include the components and entities of system 100 of FIG. 1, the components and entities of system 200 of FIG. 2, the components and entities of system 300 of FIG. 3, the role of FIG. 4, the entities of the system flow 500 of FIG. 5, and the methods represented by the flow charts of FIGS. 6-8, for example.

Generally, programs include routines, methods, data structures, other software components, etc., that perform particular tasks or implement particular abstract data types. All or portions of the operating system 920, applications 922, modules 924, and/or data 926 can also be cached in memory such as the volatile memory 910, for example. It is to be appreciated that the disclosed architecture can be implemented with various commercially available operating systems or combinations of operating systems (e.g., as virtual machines).

The storage subsystem(s) 914 and memory subsystems (906 and 918) serve as computer readable media for volatile and non-volatile storage of data, data structures, computer-executable instructions, and so forth. Computer readable media can be any available media that can be accessed by the computer 902 and includes volatile and non-volatile media, removable and non-removable media. For the computer 902, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 902, programs, and data using external user input devices 928 such as a keyboard and a mouse. Other external user input devices 928 can include a microphone, an IR (infrared) remote control, a joystick, a game pad, camera recognition systems, a stylus pen, touch screen, gesture systems (e.g., eye movement, head movement, etc.), and/or the like. The user can interact with the computer 902, programs, and data using onboard user input devices 930 such a touchpad, microphone, keyboard, etc., where the computer 902 is a portable computer, for example. These and other input devices are connected to the processing unit(s) 904 through input/output (I/O) device interface(s) 932 via the system bus 908, but can be connected by other interfaces such as a parallel port, IEEE 1394 serial port, a game port, a USB port, an IR interface, etc. The I/O device interface(s) 932 also facilitate the use of output peripherals 934 such as printers, audio devices, camera devices, and so on, such as a sound card and/or onboard audio processing capability.

One or more graphics interface(s) 936 (also commonly referred to as a graphics processing unit (GPU)) provide graphics and video signals between the computer 902 and external display(s) 938 (e.g., LCD, plasma) and/or onboard displays 940 (e.g., for portable computer). The graphics interface(s) 936 can also be manufactured as part of the computer system board.

The computer 902 can operate in a networked environment (e.g., IP) using logical connections via a wired/wireless communications subsystem 942 to one or more networks and/or other computers. The other computers can include workstations, servers, routers, personal computers, microprocessor-based entertainment appliance, a peer device or other common network node, and typically include many or all of the elements described relative to the computer 902. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 902 connects to the network via a wired/wireless communication subsystem 942 (e.g., a network interface adapter, onboard transceiver subsystem, etc.) to communicate with wired/wireless networks, wired/wireless printers, wired/wireless input devices 944, and so on. The computer 902 can include a modem or has other means for establishing communications over the network. In a networked environment, programs and data relative to the computer 902 can be stored in the remote memory/storage device, as is associated with a distributed system. It will be appreciated that the network connections shown are exemplary and other means of establishing a communications link between the computers can be used.

The computer 902 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 10:
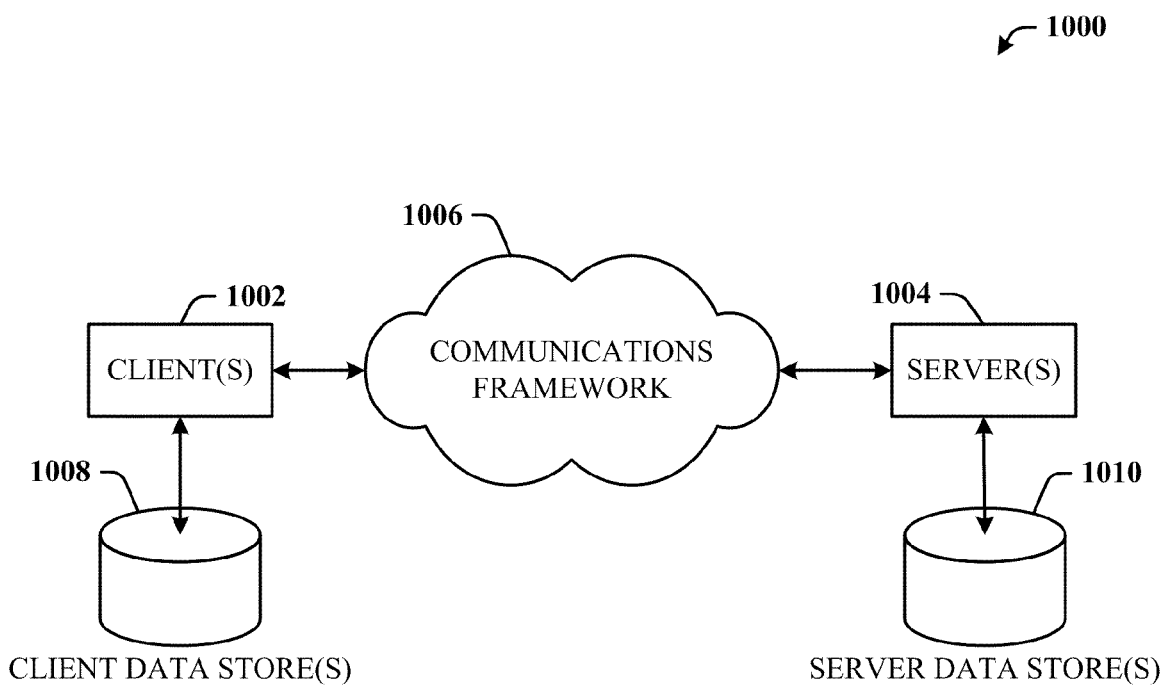
FIG. 10 illustrates a schematic block diagram of a computing environment that facilitates centralized role-based security delegation.

Referring now to FIG. 10, there is illustrated a schematic block diagram of a computing environment 1000 that facilitates centralized role-based security delegation. The environment 1000 includes one or more client(s) 1002. The client(s) 1002 can be hardware and/or software (e.g., threads, processes, computing devices). The client(s) 1002 can house cookie(s) and/or associated contextual information, for example.

The environment 1000 also includes one or more server(s) 1004. The server(s) 1004 can also be hardware and/or software (e.g., threads, processes, computing devices). The servers 1004 can house threads to perform transformations by employing the architecture, for example. One possible communication between a client 1002 and a server 1004 can be in the form of a data packet adapted to be transmitted between two or more computer processes. The data packet may include a cookie and/or associated contextual information, for example. The environment 1000 includes a communication framework 1006 (e.g., a global communication network such as the Internet) that can be employed to facilitate communications between the client(s) 1002 and the server(s) 1004. The server(s) 1004 can include the centralized role-based security framework, for example. The client(s) 1002 can operate to interface to the server(s) 1004 to derive delegating roles, and manage scopes in accordance herein.

Communications can be facilitated via a wire (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented role-based delegation system, comprising:
   one or more processing units; and
   a memory subsystem operatively coupled to the processing units and comprising
      a role-based security framework that includes roles in a containment hierarchy,
         the containment hierarchy including existing roles and derived roles, the derived roles derived from the existing roles,
         wherein an existing role includes actions and action parameters that define access to resources, and a derived role includes equal or fewer of the actions and action parameters of the existing role from which the derived role is generated, and
         wherein the actions and action parameters of the derived role can be removed and added back, not to exceed the actions and action parameters of the existing role from which the derived role is generated,
      a delegation component configured to
         create and configure a delegating assignment to a first role, the delegating assignment indicating the capability to delegate the first role to other users, and
         create and configure a non-delegating assignment for a second role that prevents delegation of the second role to other users, and
      a scope component configured to define a scope of the delegating assignment.

2. The system of claim 1, wherein a derived role is created in a parent-child relationship with an existing role from which the derived role is generated.

3. The system of claim 1, wherein the scope component automatically scopes the delegating assignment to appropriate actions and action parameters.

4. The system of claim 1 wherein the scope of the derived role is automatically reduced as the derived role is further delegated.

5. The system of claim 1 wherein the memory subsystem contains at least one pre-defined role which cannot be modified.

6. The system of claim 1 wherein at least one of the actions or action parameters of a derived role are automatically reduced if the actions or action parameters of the existing role are reduced.

7. A computer-implemented role-based delegation system, comprising:
   one or more processing units; and
   a memory subsystem operatively coupled to the processing units and comprising
      a role-based security framework that includes existing roles in a containment hierarchy,
         the existing roles including permission entries that define access to resources,
         the permission entries including actions and action parameters that can be removed or added back, not to exceed permissions defined by the actions and action parameters of the existing role from which the derived role is created, and
         the containment hierarchy further comprises a derived role that includes equal or fewer of the entries of the existing role from which the derived role is created
      a delegation component configured to
         create and configure a delegating assignment for an existing role, the delegating assignment indicating the capability to delegate the role to other users, and
         create and configure a non-delegating assignment for a role that prevents delegation of the role to other users, and
      a scope component configured to define a scope of the delegating assignment relative to scope of the existing role.

8. The system of claim 7, wherein the scope of the delegating assignment is limited to the scope of the existing role or a smaller scope than the existing role.

9. The system of claim 7, wherein the scope of the derived role is automatically reduced as the derived role is further delegated.

10. The system of claim 7 wherein the memory subsystem contains at least one pre-defined role which cannot be modified.

11. The system of claim 7 wherein at least one of the actions or action parameters of a derived role are automatically reduced if the actions or action parameters of the existing role are reduced.

12. A computer-implemented role-based delegation method comprising running computer-executable instructions on one or more computers to perform the operations of:
receiving fixed roles of a role-based security framework;
structuring the fixed roles in a containment hierarchy;
deriving and configuring a derived role from one of the fixed roles, the one of the fixed roles having associated role entries;
copying the associated role entries to the derived role, the role entry including actions and action parameters;
removing a role entry from the derived role;
adding the deleted role entry back to the derived role; and
wherein a scope of the derived role is defined relative to a scope of the one of the fixed roles.

13. The method of claim 12, further comprising running computer-executable instructions on the one or more computers to perform the operation of granting the derived role within limitations of the scope of the one of the fixed roles.

14. The method of claim 12, further comprising running computer-executable instructions on the one or more computers to perform the operation of structuring the derived role in hierarchical containment of the one of the fixed roles.

15. The method of claim 12, further comprising running computer-executable instructions on the one or more computers to perform the operation of modifying the derived role if there are no restrictions to delegation.

16. The method of claim 12, further comprising running computer-executable instructions on the one or more computers to perform the operation of reducing the scope of the derived role as the derived role is further delegated.

17. The method of claim 12 wherein at least one fixed role is a pre-defined role which cannot be modified.

* * * * *